US005751841A

United States Patent [19]

Leong et al.

[11] Patent Number: 5,751,841

[45] Date of Patent: May 12, 1998

[54] METHOD AND APPARATUS FOR SCANNING BANK NOTES

[75] Inventors: Liem H. Leong; Brian E. Storey, both of Dundee, Scotland

[73] Assignee: NCR Corporation, Dayton, Ohio

[21] Appl. No.: 602,526

[22] Filed: Feb. 20, 1996

[30] Foreign Application Priority Data

Sep. 29, 1995 [GB] United Kingdom .................. 9519886

[51] Int. Cl.$^6$ .................. G06K 9/03

[52] U.S. Cl. .................. 382/137; 356/237

[58] Field of Search .................. 382/135, 137, 382/138, 140, 141, 149, 150, 309; 235/379; 209/534; 348/125; 356/237; 250/559.45

[56] References Cited

U.S. PATENT DOCUMENTS

| | | | |
|---|---|---|---|
| 4,435,834 | 3/1984 | Pauli et al. | 382/135 |
| 4,487,306 | 12/1984 | Nao et al. | 382/135 |
| 4,550,433 | 10/1985 | Takahashi | 382/135 |
| 4,559,451 | 12/1985 | Curl | 356/237 |
| 4,623,975 | 11/1986 | Kagami | 209/534 |
| 4,710,963 | 12/1987 | Chapman et al. | 382/135 |
| 4,723,072 | 2/1988 | Naruse | 235/379 |
| 4,984,280 | 1/1991 | Abe | 382/135 |
| 5,253,167 | 10/1993 | Yoshida et al. | 235/379 |

FOREIGN PATENT DOCUMENTS 0622930 11/1994 European Pat. Off. .

*Primary Examiner*—Michael T. Zafavi
*Assistant Examiner*—Jon Chang
*Attorney, Agent, or Firm*—Michael Chan

[57] ABSTRACT

The invention relates to a method of and apparatus for optically scanning bank notes, the method including the steps of transmitting the bank notes along a transport path, illuminating each of the bank notes from one side of the transport path and forming a representation of the bank note utilizing a photo-electric means located on the opposite side of the transport path. The invention is characterized by determining the location of any defect in the bank note in relation to the boundaries of the bank note and determining whether or not the bank note is acceptable for use in an automated teller machine (ATM), dependent on the location of any detected defect.

9 Claims, 5 Drawing Sheets

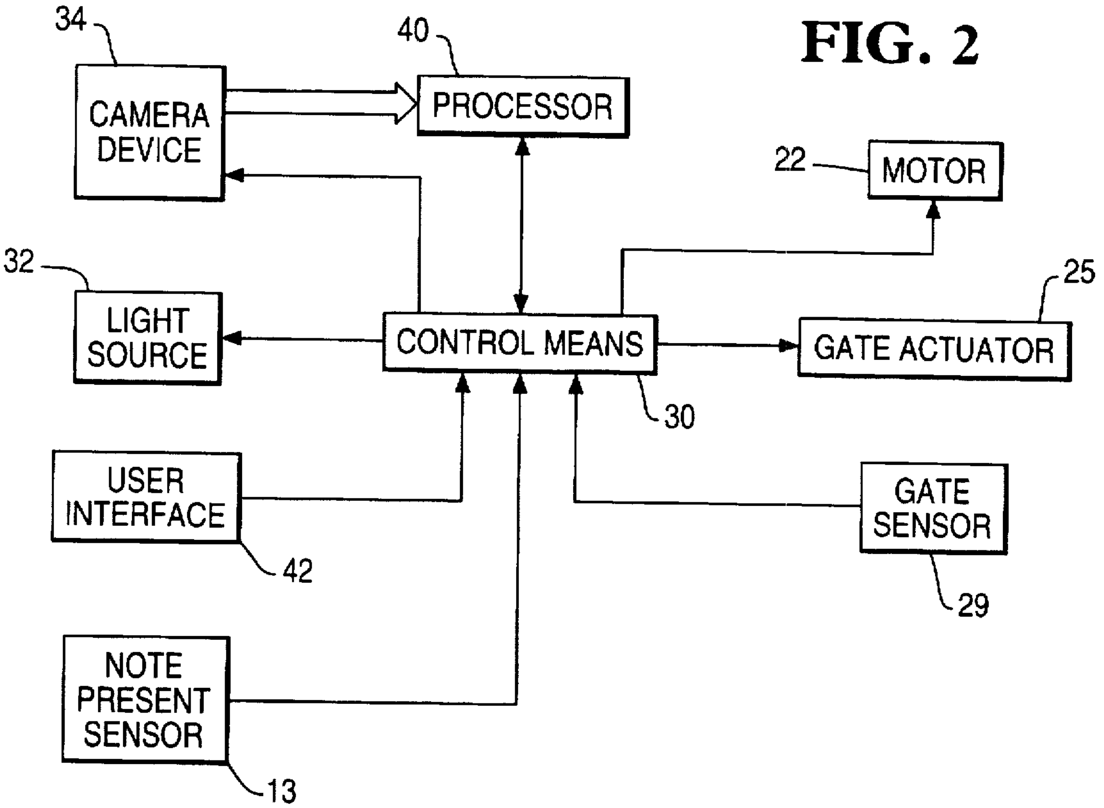
FIG. 2
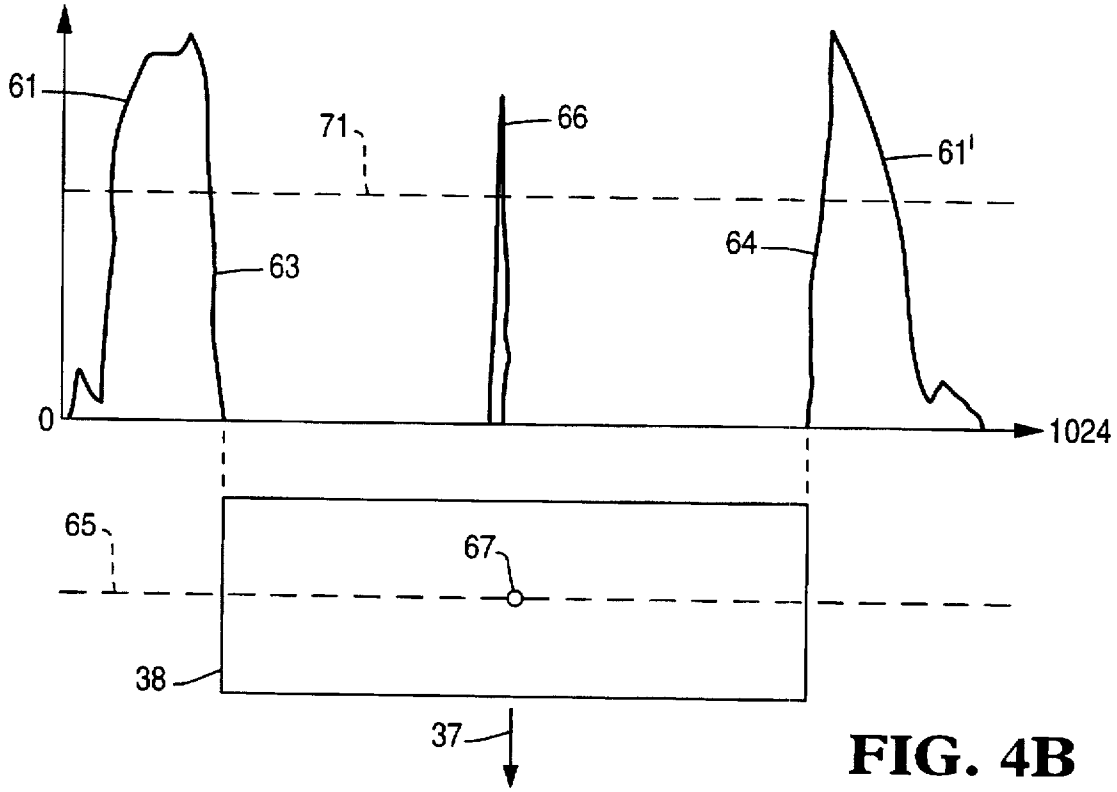
FIG. 4A
FIG. 4B

METHOD AND APPARATUS FOR SCANNING BANK NOTES

BACKGROUND OF THE INVENTION

The present invention relates to a method and apparatus for scanning bank notes, and in particular to a method and apparatus which utilizes light transmission optical bank note scanning.

The invention has application, for example, to an optical scanner for use in an automated currency loading module used to load currency storage cassettes, in which bank notes are stored in an automated teller machine (ATM) prior to being dispensed to customers, or in a currency condition screening module in a financial transaction terminal, such as an ATM.

Bank notes intended for use in an ATM may require to be scanned to determine their condition. A damaged bank note may not be suitable for use in an ATM as tears or holes in the note may cause the note to become jammed in the transport means utilized to transport notes within the ATM. Therefore, damaged bank notes need to be screened out by automated currency loading modules before currency storage cassettes are filled and loaded into an ATM. Also, ATMs which are adapted to enable users to deposit individual bank notes, and to re-issue these notes to other users of the ATM, must also be adapted to screen out damaged notes so that an attempt is not made to dispense these notes to other users.

The detection of notes containing pinholes or other holes is particularly important if the notes are intended for use in an ATM which utilizes suction pick means to pick notes from a currency storage cassette. If a pinhole in such a bank note is located in an area of the note at which the pick means contacts the note, then the pinhole may result in the pick means mispicking. For example, if a note to be picked from a currency storage cassette contains a pinhole, the pick means may fail to pick that note or may pick both the note intended to be picked and the adjacent note. If a double feed is detected, by sensors within the ATM, the picked notes are diverted to a purge bin, and it is necessary to pick an additional note to ensure that the correct number of notes is always dispensed to the user of the ATM.

A known bank note scanner, disclosed in U.S. Pat. No. 4,984,280, utilizes transport means for transporting bank notes along a transport path throughout the scanner. A light source is located on one side of the transport path to illuminate the bank notes and a photo-electric means is located on the opposite side of the transport path from said light source to produce a representation of the scanned bank note. The photo-electric means produces a predominately black representation of the bank note, with light patches, corresponding to any damaged areas of the note, caused by the transmission of light through the damaged areas of the note.

Some damage to bank notes may be tolerated, such as pinholes in non-sensitive areas remote from those sections of the note which are contacted by suction pick means when the note is picked from the currency storage cassette of an ATM. However, the above mentioned known bank note scanner can not distinguish between damage to a bank note which can be tolerated and damage that can not be tolerated.

SUMMARY OF THE INVENTION

It is an object of the present invention to provide an optical bank note scanner and method of scanning bank notes which allows notes containing an insignificant defect, which does not affect the mechanized transportation of the note or the suction picking of the note, to be accepted for use while ensuring that a note having a significant defect is rejected.

According to a first aspect of the present invention there is provided a method of optically scanning bank notes comprising the steps of transmitting said bank notes along a transport path, illuminating each of said bank notes from one side of said transport path, forming a representation of each bank note utilizing photo-electric means located on the opposite side of said transport path, characterized by determining the location of any predetermined type of defect in said bank note in relation to the boundaries of the bank note, and determining whether or not said bank note is acceptable for use in an automated teller machine (ATM), dependent on the location of any such defect or defects which have been detected.

According to a second aspect of the present invention there is provided a method of determining the fitness of a bank note for a predetermined use in which the note is scanned to form a digital representation thereof, characterized by the steps of processing said digital representation to determine the location and size of any predetermined type of defect in said note, and determining said fitness of said note on the basis of the location and size of any such defect or defects which have been detected.

According to a third aspect of the present invention there is provided an optical bank note scanner comprising transport means for transporting bank notes through the scanner along a transport path, a light source located on one side of said transport path in order to illuminate each of said bank notes, and photo-electric means located on the opposite side of said transport path from said light source for producing a representation of said bank note, characterized by means for determining the location of any predetermined type of defects in said bank note with respect to the boundaries of said bank note, and means for determining whether or not the bank note is acceptable for use in an automated teller machine (ATM), dependent on the location of any defect or defects which have been detected.

BRIEF DESCRIPTION OF THE DRAWINGS

An embodiment of the present invention will now be described, by way of example, with reference to the accompanying drawings in which:

FIG. 2 is a block diagram of an optical bank note scanner in accordance with the present invention;

FIG. 4A is a graphical representation of the output signals from the charge coupled device (CCD) elements of FIG. 3;

FIG. 4B is a graphic representation of a scan line through a bank note, for which the array of FIG. 3 produces the output represented in FIG. 4A;

DETAILED DESCRIPTION

Figure 1A:
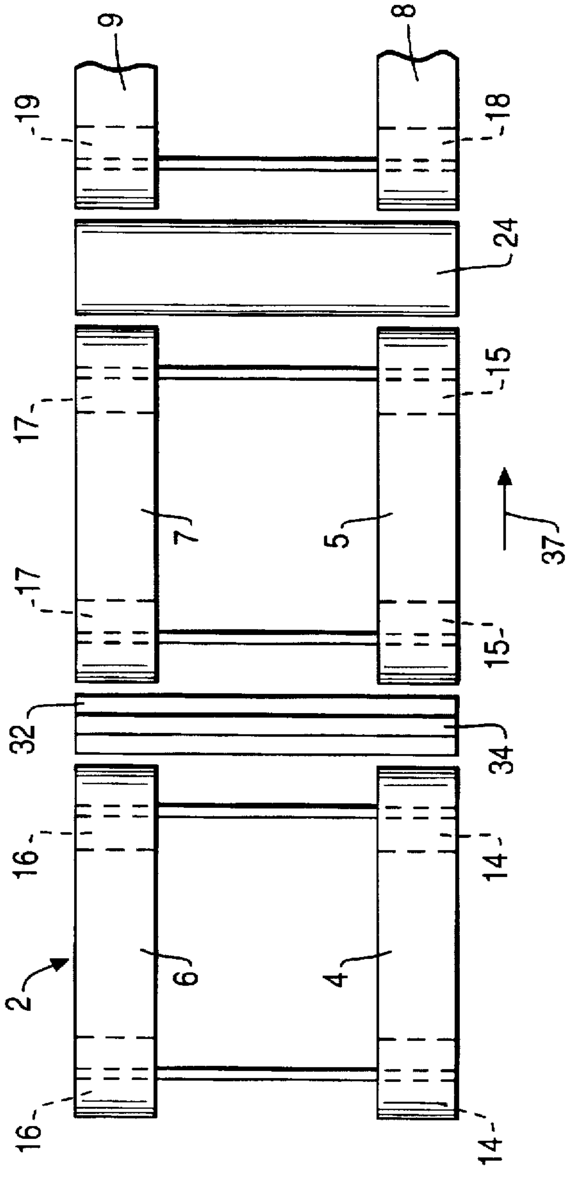
FIG. 1A. is a schematic plan view of a portion of an optical bank note scanner in accordance with the present invention.
Figure 1B:
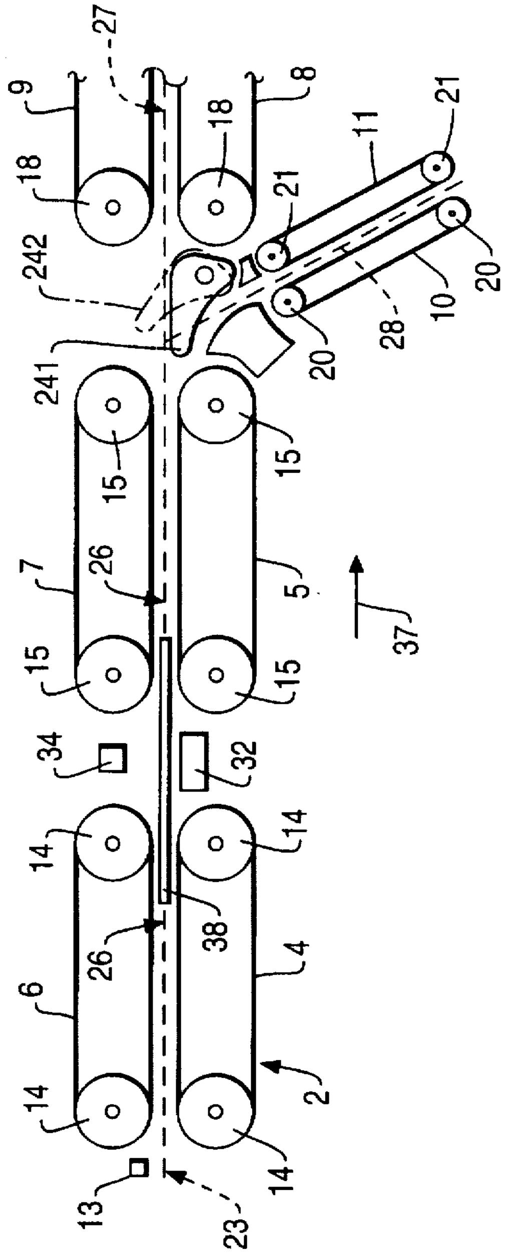
FIG. 1B is a schematic side view of the portion of the scanner of FIG. 1A.

Referring particularly to FIGS. 1A and 1B there is illustrated a portion of an optical bank note scanner 2, suitable for use in an automated currency loading module (not shown). The scanner 2 incorporates transport means in the form of a plurality of belt means 4 to 11, and associated pulleys 14 to 21, some of which are driven through gear means (not shown) by a motor 22 (FIG. 2) so as to drive the belt means 4 to 11.

The belt means 4 to 7 form a first feed path 26, located adjacent a gate 24. When the gate 24 is in a first position 241, the gate 24 directs acceptable bank notes from the first feed path 26 to a continuation feed path 27 formed by belt means 8 and 9, for storage in a currency storage cassette (not shown). When the gate 24 is in a second position 242, the gate 24 directs rejected bank notes along a second feed path 28 formed by belt means 10 and 11, to a purge bin (not shown). The position of the gate 24 is controlled by a control means 30 (FIG. 2), as will be discussed below.

The scanner 2 also incorporates a light source 32 in the form of a fluorescent tube light. The light source 32 is located beneath the first feed path 26, between the belt means 4 and 5. A photo-electric means 34, in the form of a high resolution charge coupled device (CCD) line scan camera such as the Fairchild CCD 1100 line scan camera, produced by Fairchild Camera & Instrument (UK) Ltd. 230 High Street, Potters Bar, Hertfordshire, England, is located above the light source 32 on the opposite side of the feed path 26, between the belt means 6 and 7.

Thus a note 38 which is transported along the first feed path 26 by the belt means 4 and 6 and the adjacent belt means 5 and 7 will pass between the light source 32 and the photo-electric means 34. The space between the belt means 4 and 6 and the adjacent belt means 5 and 7, in which the light source 32 and photo-electric means 34 are located, is arranged so that the belt means 5 and 7 receive the note 38, for continued transportation, prior to the belt means 4 and 6 releasing the note 38.

Referring to FIG. 2 the operation of the scanner 2 is controlled by a control means 30 in the form of a central processor unit. The control means 30 causes the light source 32, the photo-electric means 34 and the motor 22 to be switched on once the control means 30 has been so instructed by a user of the scanner 2 through a user interface 42.

The scanner 2 is now ready to scan bank notes 38 (FIG. 1) which are fed along the first feed path 26, as discussed above.

Bank notes 38 which are to be fed along the feed path 26 are detected by a note present detector 13 located at the input end of the feed path 26. The note present detector 3 informs the control means 30 of the presence of a bank note 38 and the control means 30 can then actuate the photo-electric means 34 at the appropriate time to scan the bank note 38.

Before discussing the data produced by the photo-electric means 34 and how it is used in a processor 40 (FIG. 2) to determine the acceptability of a bank note 38, it is appropriate to discuss how CCD devices produce a representation, in general.

Figure 3:
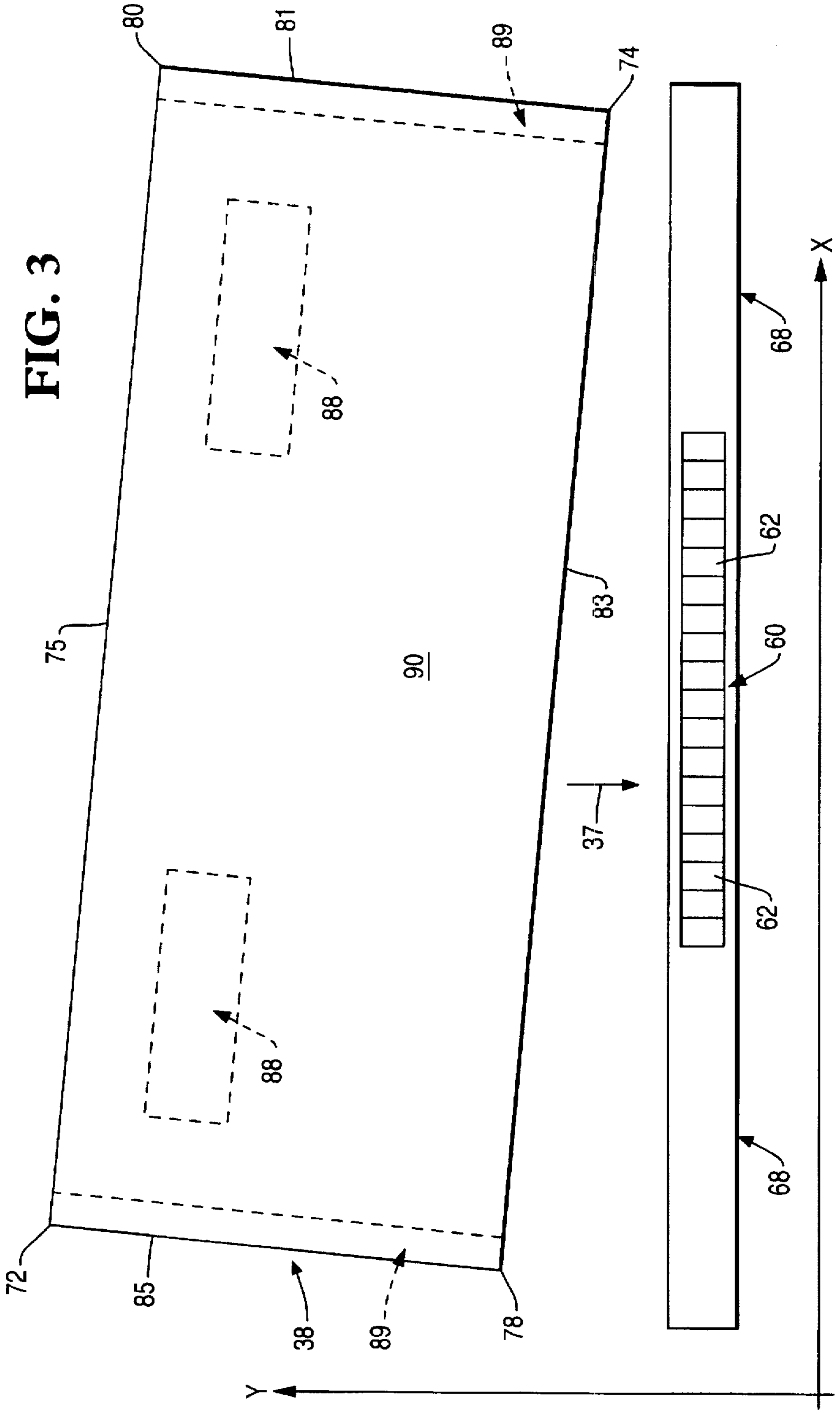
FIG. 3 is a schematic representation of a bank note and an array of charge coupled device (CCD) elements incorporated in a photo-electric means in accordance with the present invention.

With reference to FIG. 3 a CCD device, such as the device mentioned above, contains a CCD chip 60. As will be known to a person skilled in the art, such CCD devices operate by focusing incident light onto an array of CCD elements 62 on the CCD chip 60, utilizing an appropriate optical system 68, thereby building up a charge on individual elements 62 dependent on the quantity of light incident on each element 62. Data is produced by sampling the charge on each of the elements 62, by transferring said charge to an associated charge measurement device (not shown), at a predetermined time. This sampling is analogous to the opening and closing of the shutter in a conventional camera. Clearly, a low charge corresponds to a dark area in the representation and a high charge to a light area. The charge on each element 62 can then be compared to a predetermined threshold level 71, to provide digital data, i.e. a "0" representing charge on a CCD element below a predetermined threshold level 71 (FIG. 4A) corresponding to an undamaged area of the bank note 38 being scanned, and a "1" representing charge above the predetermined threshold level 71 and corresponding to light coming from beyond an edge of the note 38, or from a damaged area of the note 38.

In a line scan camera the object to be scanned is drawn along below the camera at a predetermined speed and each CCD element 62 is sampled a predetermined number of times.

Each time the CCD element 62 is sampled it produces a signal representative of a pixel, that is a component part of the final representation of the bank note 38. Each time all of the CCD elements 62 in the array are sampled, a representation of a line, say line 65 (FIG. 4B), on the bank note 38 is produced, which is converted from an analog output (FIG. 4A) into a series of 0's and 1's, dependent on whether or not the charge on individual elements exceeds the aforementioned threshold, as discussed above.

Regarding FIG. 4A the extreme left and right edges 61,61' of the line scan image are not related to the note 38 being scanned, these edges 61,61' being produced by spurious signals from the CCD elements nearest the ends of the array, due to loss of light caused by edge effects in the lens system 68 used to focus the light onto the array. The inner right and left edges 63,64 correspond to the edges of the bank note 38 for that particular scan line 65. Also the peak 66 in the output is caused by a pinhole 67 in the bank note 38 being scanned.

The CCD device mentioned above has 1024 CCD elements 62 arranged in a line perpendicular to the direction of movement 37 of the note 38 to be scanned (FIG. 3). In the present embodiment 200 lines are required to provide a representation of each of the bank notes comprising the standard currencies with which the scanner 2 is intended for use. The size of the smallest defect which can be detected by the scanner 2 is related to the number of CCD elements 62 in the array. A 1024 element array can detect a defect as small as 1 $mm^2$. If larger sized defects are acceptable the 1024 element array can be replaced by an array with fewer CCD elements, thus reducing the cost of the scanner 2.

The data produced by a CCD camera is conceptually similar to the raster scan data used in TV systems, with the exception that TV systems produce both the line and frame scans electronically, whereas in the case of a CCD camera the line scan is electronic and the frame scan is created by the linear motion of the bank note 38 passing under the camera due, in the present embodiment, to the movement of the belt means 4 to 7. Thus a CCD line scan camera requires that the bank note 38 is moving whilst the representation is being produced, which is ideal for a scanner 2 in accordance with the present invention.

As the representation of the note is produced while the note is moving a scanner in accordance with the present invention can scan between 10 and 20 notes per second.

If the 1024 CCD elements 62 are considered as an X axis and the 200 scan lines produced during the scanning of a bank note 38 are considered as a Y axis (FIG. 3), the data from each specific sample of each individual CCD element can be given an X and a Y co-ordinate, i.e. the 10th sample from the 500th CCD element would have co-ordinates (500,10).

The processor 40 is arranged to note the co-ordinates of each sample having a "0" value, adjacent a sample having a "1" value, as these signals correspond to either an edge of the note 38 or an edge of a damaged area of the note 38. These co-ordinates are then processed in the processor 40 to determine the co-ordinates with: the lowest X and Y value; the highest X and Y valve; the lowest X and highest Y value; and the highest X and lowest Y value, which will correspond to the four corners 78,80,72 and 74 respectively (FIG. 3) of the bank note 38 being scanned. The processor 40 then draws lines between adjacent corners 72-80,80-74,74-78,78-72, thus producing a two dimensional representation of the bank note 38, as illustrated in FIG. 3.

Furthermore, the device can also detect a skewed note, as the long axis of the note, between corners 74 and 78 in FIG. 3, would not lie parallel to the X axis. Such skewed notes can then be diverted by the gate 24 (FIG. 1) under the control of the control means 30 (FIG. 2).

Figure 5A:
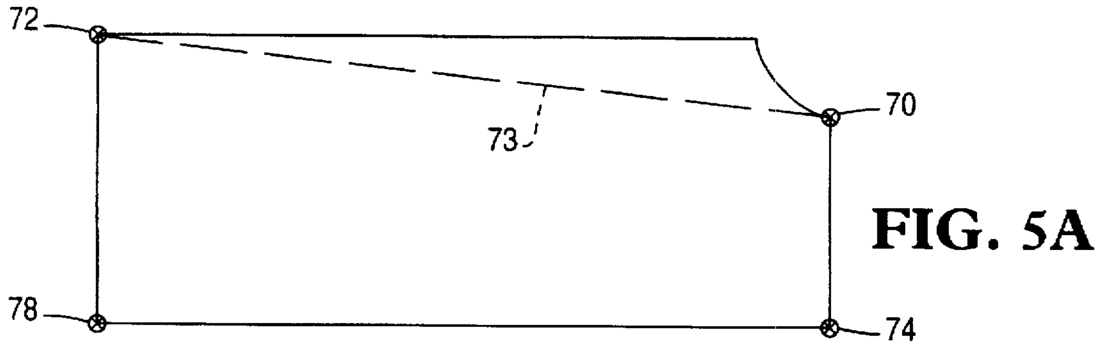
FIGS. 5A to 5D are graphic representations of a method of determining the boundaries of a bank note with an edge defect, in accordance with the present invention.
Figure 5B:
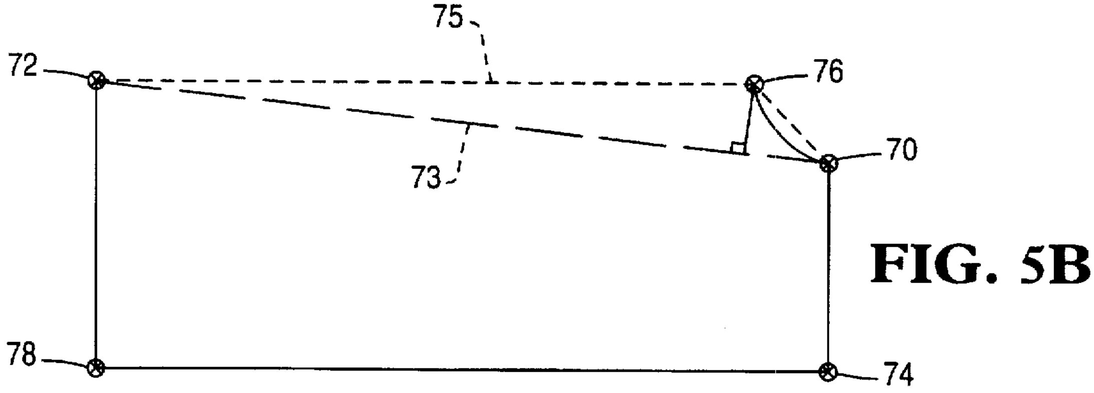
Figure 5C:
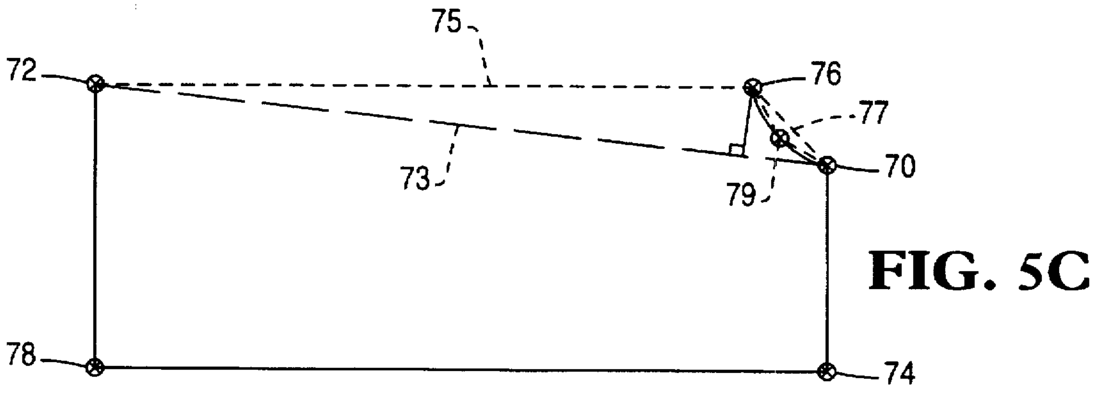

This process for obtaining a representation of the bank note 38 is sufficient if all four corners of the bank note are present. However, if one of the corners is damaged an erroneous result may be produced, as illustrated by the dashed line 73 between corners 70 and 72 in FIG. 5A. In order to compensate for any such errors the processor 40 scans the data with co-ordinates adjacent those of the line 73 between corners 72 and 70, looking for samples with a "0" value adjacent samples with a "1" value, as the co-ordinates of these "0" value samples will represent the true edge of the bank note 38. The processor 40 then determines which of these samples on the true edge of the bank note 38 is furthest from the line 73, along a line perpendicular to this line 73, as illustrated in FIG. 5B. A second approximation of the outline of the bank note 38 is then drawn, comprising a line 75 (which lies along the true edge of the bank note 38) between corner 72 and the most remote point 76, and a line 77 between the point 76 and the corner 70. As the line 75 lies along the true edge of the bank note 38, if the process is repeated again for line 75 no points are found which are remote from the line 75. However, if the process is repeated for the line 77 between point 76 and corner 70 another point 79 is determined, which is the most remote point from the line 77, along a line perpendicular to the line 77, as illustrated in FIG. 5C. A third approximation to the boundary of the bank note 38 is then produced by drawing a line between the point 76 and the point 79 and a line between the point 79 and the corner 70. This process can be repeated as often as necessary until a representation of the bank note 38 is produces which lies within predetermined error margins.

This process is also undertaken for line 81, between corners 70 and 74, line 83, between corners 74 and 78 and line 85, between corners 78 and 72. However, as these lines 81,83,85 lie along the actual boundaries of the bank note 38, within predetermined error limits, no points remote from these lines 81,83,85 are located.

Figure 5D:
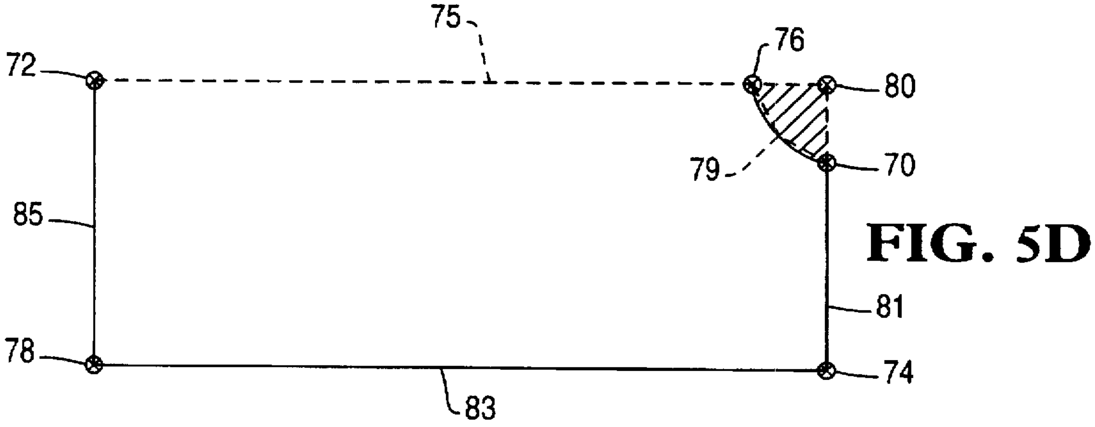

Once this accurate representation of the bank note 38 is produced an approximation of the outline of the bank note 38, in which the damage corner 80 is reinstated, is produced by projecting the lines 75 and 81 until they meet at the corner 80 of the "undamaged" bank note, as illustrated in FIG. 5D.

As the boundaries 75,81,83,85 of the bank note 38 are now known, a weighting matrix can be overlaid onto the representation of the bank note 38 (FIG. 3), detailing areas 88,89 with a high weighting factor in which the bank note 38 is sensitive to damage and areas 90 with a low weighting factor in which the bank note 38 is not sensitive to damage. For example, as discussed above, if the bank note 38 is to be used with an ATM incorporating suction pick means, areas 88 of the bank note 38 which are contacted by suction pick means during picking constitute areas of high weighting factor, whereas areas 90 remote from the aforementioned areas 88 may constitute areas of a low weighting factor. Also areas 89 adjacent the left and right boundaries 81,85 of the bank note 38 will constitute areas of high weighting factor, because these areas 89 of the bank note 38 are used by the belt means 4 to 11, and by transport means in an ATM (not shown), to transport the bank note 38. Therefore, as discussed above, damage to these areas 89 of the bank note 38 may cause the bank note 38 to become jammed in the belt means 4 to 11 within the scanner 2 or the transport means in an ATM.

As discussed above, the location and size of a defect can be obtained in terms of XY co-ordinates from the representation of the scanned note in FIG. 3. The location of the defect is taken to be the XY co-ordinate approximately at the center of the defect, such as a pinhole. The area of the defect can be calculated by counting the number of CCD element samples with adjacent XY co-ordinates which have a value "1", as these samples each correspond to a pixel in the representation of the defect in the bank note 38.

Therefore, scanning a bank note 38 provides the processor 40 with a determination of both the size of any predetermined type of defects in the bank note 38 and their location in relation to the boundaries 75,81,83,85 of the bank note 38 and thus in relation to the weighting matrix overlaid onto the representation of the bank note 38, as illustrated in FIG. 3. It should be understood that in this embodiment reference to predetermined type of defect means any defect, such as a hole, tear or fold at the edge of a bank note, which gives rise to detected passage of light.

Figure 6:
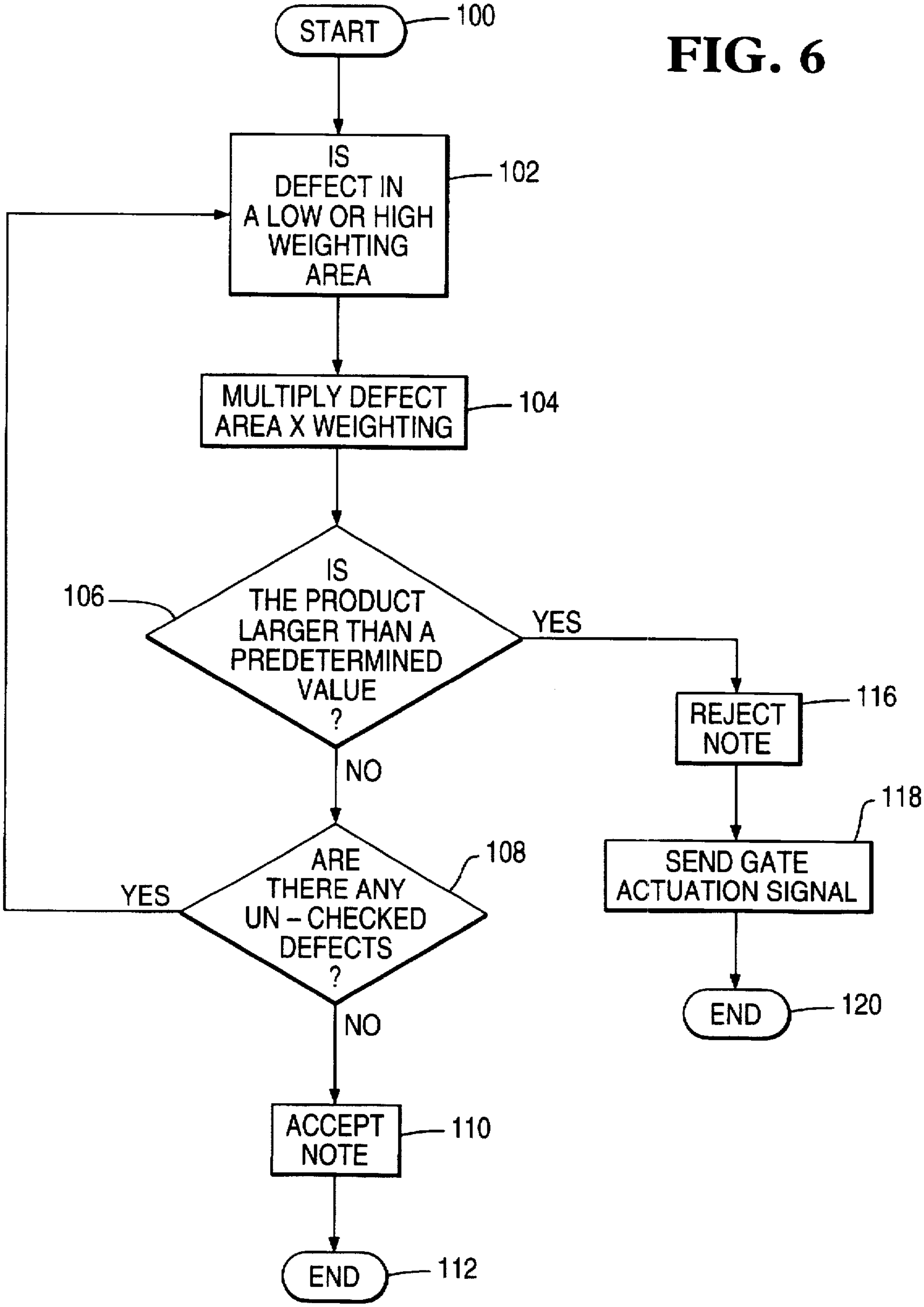
FIG. 6 is a flow diagram of a method of determining the acceptability of a scanned bank note in accordance with the present invention.

Once the processor 40 has determined the boundaries 75,81,83,85 of a bank note 38 and the size and location of any defects detected by the scanner 2, the processor 40 determines whether or not the bank note 38 is acceptable, utilizing the method illustrated in FIG. 6.

With regard to FIG. 6 the process starts (box 100) and the processor 40 asks the question "is the defect in a high or low weighting factor area" (box 102). The processor 40 then multiplies the appropriate weighting factor corresponding to the location of the defect by the area of the defect (that is the number of samples covered by the defect), box 104. The product of this multiplication is called the "reject number". The processor 40 then asks the question (box 106) "is the product larger than a predetermined maximum". If the answer to this question is no, the processor 40 proceeds to box 108 and asks the question "are there any un-checked defects" in the bank note 38. If the answer to this question is again no, then the processor 40 proceeds to box 110 and the note is accepted, the control means 30 maintains the gate 24 in the first position 241 and the bank note 38 is transported along the continuation feed path 27, as discussed above. The process is then ended, box 112, and the scanner 2 may scan the next bank note to be scanned. If the answer to the question asked in box 108 is yes and there is one or more un-checked defects in the bank note 38, then the processor 40 will move from box 108 back to box 102 and repeat the process for the next defect. If the answer to the question asked in box 106 is yes and the reject number is greater than the predetermined maximum, for any defect in the bank note 38, then the processor 40 will move from box 106 to box 116 and the bank note 38 will be rejected. Once the bank note 38 has been rejected the processor 40 will move to box 118 and transmit a signal to this effect to the control means 30 and the control means 30 will cause the gate 24 to be moved from its first position 241 to its second position 242 so as to divert the rejected bank note 38 into the second feed path 28 for transportation to the purge bin (not shown) as discussed above. Thereafter, the processor 40 will move to box 120 and the process will be stopped. As with the accepted bank note 38, the scanner 2 may now scan another bank note.

In order to alter the size of defect which will be considered to be acceptable in a particular area 88,89,90 of the bank note 38 the weighting factor in that area 88,89,90 may be altered. If the weighting factor is increased the size of an acceptable defect is correspondingly decreased as the reject number must still fall below the aforementioned acceptable value for the note 38 to be accepted.

In the case of a scanner incorporated into the currency condition screening module in an ATM, the scanner will be activated on receipt of a signal for the control means (not shown) in the ATM, once a user of the ATM has inserted a bank note into a deposit slot in the ATM. Also, a scanner incorporated in an ATM will not include a gate to divert unacceptable notes to a purge bin; instead, a bi-directional motor will be incorporated to drive the belt means 4 to 7, so that unacceptable notes may be returned to the user of the ATM, through the deposit slot.

What is claimed is:

1. A method of optically scanning a bank note, the method comprising the steps of:

(a) moving the bank note along a transport path;

(b) illuminating the bank note from one side of the transport path;

(c) obtaining a representation of the boundaries of the bank note based upon illumination of the bank note in step (b);

(d) determining the location of any predetermined type of defect in the bank note relative to the boundaries of the bank note by using the representation of the boundaries of the bank note obtained in step (c);

(e) creating a weighting matrix which provides different weighting factors to different areas of the bank note;

(f) determining whether or not the bank note is acceptable for use in an automated teller machine (ATM) depending upon the location of any defect or defects which have been located in the bank note as determined in step (d) and weighting factors as determined in step (e):

step (c) including the step of (c-1) determining the boundaries of the bank note by converting data corresponding to the boundaries of the bank note into XY coordinates;

step (c-1) including the step of (c-1-1) providing a charge coupled device (CCD) including a linear array of CCD elements such that the X co-ordinates of the boundaries are determined by the numbers of the CCD elements at which the boundaries are located, and the Y coordinates are determined by the numbers of the line scan at which the boundaries are located;

step (d) including the step of (d-1) determining the location of any defect located in the bank note relative to the boundaries of the bank note by determining the XY coordinates of the defect.

2. A method according to claim 1, further comprising the step of: (g) before step (f), determining the size of any detected defect by counting the number of samples from adjacent CCD elements required to represent the defect.

3. A method according to claim 1, wherein step (f) includes the step of:

(f-1) accepting a bank note which contains a defect the size of which is below a first predetermined maximum and which is located in an area with a high weighting factor.

4. A method according to claim 3, wherein step (f) includes the step of:

(f-2) accepting a bank note which contains a defect the size of which is below a second predetermined maximum and which is located in an area with a low weighting factor.

5. A method according to claim 4, wherein the first predetermined maximum is lower than the second predetermined maximum.

6. A method of optically scanning a bank note, the method comprising the steps of:

(a) moving the bank note along a transport path;

(b) illuminating the bank note from one side of the transport path;

(c) obtaining a representation of the boundaries of the bank note based upon illumination of the bank note in step (b);

(d) determining the location of any predetermined type of defect in the bank note relative to the boundaries of the bank note by using the representation of the boundaries of the bank note obtained in step (c);

(e) creating a weighting matrix which provides different weighting factors to different areas of the bank note, (f) determining whether or not the bank note is acceptable for use in an automated teller machine (ATM) depending upon the location of any defect or defects which have been located in the bank note as determined in step (d) and the weighting factors as determined in step (e).

7. A method according to claim 6, wherein step (f) includes the step:

(f-1) accepting a bank note which contains a defect the size of which is below a first predetermined maximum and which is located in an area with a high weighting factor.

8. A method according to claim 7, wherein step (f) includes the step of:

(f-2) accepting a bank note which contains a defect the size of which is below a second predetermined maximum and which is located in an area with a low weighting factor.

9. A method according to claim 8, wherein the first predetermined maximum is lower than the second predetermined maximum.

* * * * *